(12) United States Patent
Sippel et al.

(10) Patent No.: US 10,253,639 B2
(45) Date of Patent: Apr. 9, 2019

(54) CERAMIC MATRIX COMPOSITE GAS TURBINE ENGINE BLADE

(71) Applicants: Rolls-Royce Corporation, Indianapolis, IN (US); Rolls-Royce North American Technologies, Inc., Indianapolis, IN (US)

(72) Inventors: Aaron Sippel, Zionsville, IN (US); Daniel Kent Vetters, Indianapolis, IN (US); Ted Freeman, Danville, IN (US); Joseph Pan Lamusga, Indianapolis, IN (US)

(73) Assignees: Rolls-Royce North American Technologies, Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 455 days.

(21) Appl. No.: 15/015,981

(22) Filed: Feb. 4, 2016

(65) Prior Publication Data

US 2016/0230568 A1    Aug. 11, 2016

Related U.S. Application Data

(60) Provisional application No. 62/112,436, filed on Feb. 5, 2015.

(51) Int. Cl.
*F01D 5/28* (2006.01)
*B23P 15/02* (2006.01)
(Continued)

(52) U.S. Cl.
CPC .............. *F01D 5/282* (2013.01); *B23P 15/02* (2013.01); *B32B 18/00* (2013.01); *F01D 5/147* (2013.01);
(Continued)

(58) Field of Classification Search
CPC .......... F01D 5/282; F01D 5/147; F01D 5/284; F01D 9/041; B23P 15/02; B32B 18/00;
(Continued)

(56) References Cited

U.S. PATENT DOCUMENTS 1,516,607 A * 11/1924 Johanson ................. F01D 5/18
                                                  415/216.1
3,664,764 A *  5/1972 Davies et al. .......... B29C 70/04
                                                   416/220 A
(Continued)

FOREIGN PATENT DOCUMENTS

WO    2014099102 A1    6/2014
WO    2014109246 A1    7/2014

OTHER PUBLICATIONS

Response to Extended Search Report and Written Opinion dated Jul. 6, 2016, from counterpart European Application No. 16154435.8, filed Jan. 25, 2017, 7 pp.
(Continued)

*Primary Examiner* — Jason D Shanske
*Assistant Examiner* — Brian Christopher Delrue
(74) *Attorney, Agent, or Firm* — Shumaker & Sieffert, P.A.

(57) ABSTRACT

The disclosure describes a gas turbine engine blade that includes a dovetail portion comprising a first ceramic matrix composite, an airfoil portion comprising the first ceramic matrix composite, a transition portion between the airfoil portion and the dovetail portion, and a platform portion that substantially surrounds the transition portion. The airfoil portion may define a capture feature that is configured to engage with and mechanically restrain the platform portion from moving beyond the capture feature toward a tip of the airfoil portion.

21 Claims, 10 Drawing Sheets

(51) Int. Cl.
*F01D 5/14* (2006.01)
*F01D 9/04* (2006.01)
*B32B 18/00* (2006.01)

(52) U.S. Cl.
CPC .............. *F01D 5/284* (2013.01); *F01D 9/041* (2013.01); *C04B 2237/38* (2013.01); *C04B 2237/76* (2013.01); *C04B 2237/86* (2013.01); *F05D 2220/32* (2013.01); *F05D 2230/21* (2013.01); *F05D 2230/23* (2013.01); *F05D 2230/25* (2013.01); *F05D 2230/314* (2013.01); *F05D 2230/60* (2013.01); *F05D 2240/12* (2013.01); *F05D 2240/30* (2013.01); *F05D 2240/80* (2013.01); *F05D 2260/30* (2013.01); *F05D 2300/2261* (2013.01); *F05D 2300/6033* (2013.01)

(58) Field of Classification Search
CPC ............ C04B 2237/38; C04B 2237/76; C04B 2237/86; C04B 2237/88; F05D 2220/32; F05D 2230/21; F05D 2230/23; F05D 2230/25; F05D 2230/314; F05D 2230/60; F05D 2240/12; F05D 2240/30
USPC ........................................................ 416/229
See application file for complete search history.

(56) References Cited

U.S. PATENT DOCUMENTS

| | | | | |
|---|---|---|---|---|
| 4,302,155 A * | 11/1981 | Grimes | ................... | B64C 11/26 416/144 |
| 4,363,602 A * | 12/1982 | Martin | ................... | F01D 5/282 416/230 |
| 4,407,635 A * | 10/1983 | Grimes | ................... | B64C 11/26 416/230 |
| 4,410,385 A * | 10/1983 | Murphy | ................ | D06M 23/06 156/181 |
| 5,022,824 A * | 6/1991 | Violette | ................ | B64C 11/008 416/230 |
| 5,244,345 A * | 9/1993 | Curtis | ................... | F01D 11/008 416/193 A |
| 5,650,229 A * | 7/1997 | Gross | ...................... | B29B 11/06 428/113 |
| 5,672,417 A * | 9/1997 | Champenois | ........... | F01D 5/282 416/230 |
| 6,666,651 B2 * | 12/2003 | Rust | ........................ | B64C 11/26 416/204 R |
| 7,329,101 B2 * | 2/2008 | Carper | ................... | C04B 35/565 416/219 R |
| 7,510,379 B2 * | 3/2009 | Marusko | ................. | F01D 5/282 29/889.7 |
| 7,968,031 B2 * | 6/2011 | Carper | ................... | C04B 35/565 264/251 |
| 7,976,281 B2 * | 7/2011 | Keith | ...................... | F01D 5/147 416/193 A |
| 8,435,007 B2 * | 5/2013 | Morrison | ................. | F23M 5/04 29/888.025 |
| 8,475,695 B2 * | 7/2013 | Carper | ................... | C04B 35/565 264/258 |
| 8,496,443 B2 * | 7/2013 | Campbell | ............... | F01D 5/081 416/248 |
| 8,607,454 B2 * | 12/2013 | Blanchard | ............... | B29C 70/24 156/148 |
| 8,714,932 B2 | 5/2014 | Noe et al. | | |
| 8,851,853 B2 * | 10/2014 | Alvanos | .................. | F01D 5/225 416/220 R |
| 9,017,033 B2 * | 4/2015 | Brown | ..................... | F01D 5/147 416/193 A |
| 9,085,986 B2 * | 7/2015 | Bianchi | .................. | F01D 5/147 |
| 9,302,764 B2 * | 4/2016 | Bianchi | .................. | B64C 27/48 |
| 9,598,967 B2 * | 3/2017 | Xu | ............................ | F01D 5/30 |
| 2002/0008177 A1 * | 1/2002 | Violette | .................. | B64C 11/04 244/123.1 |
| 2003/0156944 A1 * | 8/2003 | Rust | ........................ | B64C 11/26 416/204 R |
| 2005/0084379 A1 * | 4/2005 | Schreiber | ................. | B23H 3/00 416/230 |
| 2005/0158171 A1 * | 7/2005 | Carper | .................... | B32B 18/00 415/200 |
| 2006/0140771 A1 * | 6/2006 | Carper | .................. | C04B 35/565 416/241 R |
| 2008/0124512 A1 * | 5/2008 | Steibel | .................. | C04B 35/573 428/105 |
| 2008/0232969 A1 * | 9/2008 | Brault | ....................... | F01D 5/22 416/219 R |
| 2009/0090005 A1 * | 4/2009 | Carper | .................. | C04B 35/565 29/888.02 |
| 2011/0027098 A1 * | 2/2011 | Noe | ...................... | C04B 35/573 416/241 B |
| 2011/0061579 A1 * | 3/2011 | Van Gelder | .......... | B62D 35/007 114/140 |
| 2011/0215502 A1 * | 9/2011 | Carper | .................. | C04B 35/565 264/258 |
| 2012/0195766 A1 * | 8/2012 | Cohin | ..................... | F01D 5/225 416/241 A |
| 2013/0004326 A1 * | 1/2013 | McCaffrey | ............. | F01D 5/147 416/241 B |
| 2013/0004331 A1 * | 1/2013 | Beeck | .................... | F01D 5/143 416/97 R |
| 2013/0011271 A1 * | 1/2013 | Shi | ........................... | F01D 5/28 416/230 |
| 2013/0171001 A1 * | 7/2013 | Garcia-Crespo | ...... | F01D 5/3007 416/241 B |
| 2013/0323073 A1 * | 12/2013 | McCaffrey | ............. | F01D 5/147 416/241 B |
| 2014/0010662 A1 * | 1/2014 | Duelm | ................... | F01D 5/147 416/230 |
| 2014/0119928 A1 * | 5/2014 | Garcia Crespo | ........ | F01D 5/147 416/219 R |
| 2015/0292340 A1 * | 10/2015 | Kawanishi | ............... | C04B 35/80 416/215 |

OTHER PUBLICATIONS

Extended European Search Report from counterpart European Application No. 16154435.8, dated Jul. 6, 2016, 7 pp.
Examination Report from counterpart European Application No. 16154435.8, dated Aug. 6, 2018, 5 pp.
Response to Examination Report dated Nov. 13, 2018, from counterpart European Application No. 16154435.8, filed Nov. 13, 2018, 13 pp.

* cited by examiner

CERAMIC MATRIX COMPOSITE GAS TURBINE ENGINE BLADE

This application claims the benefit of U.S. Provisional Application No. 62/112,436, filed Feb. 5, 2015, which is incorporated herein by reference in its entirety.

TECHNICAL FIELD

The present disclosure generally relates to techniques for forming a ceramic matrix composite (CMC) gas turbine engine blade and CMC gas turbine engine blades.

BACKGROUND

Gas turbine engines includes gas turbine engine blades, which compress inlet gases prior to the combustor and extract work from hot combustion gases after the combustor. A gas turbine engine blade includes an airfoil, a platform, which defines the inner annulus of the flowpath, and an attachment feature for attaching the gas turbine engine blade to a gas turbine engine disk.

SUMMARY

In some examples, the disclosure describes a gas turbine engine blade including a dovetail portion comprising a first ceramic matrix composite, an airfoil portion comprising the first ceramic matrix composite, a transition portion between the airfoil portion and the dovetail portion, and a platform portion that substantially surrounds the transition portion. The gas turbine engine blade may define a radial axis extending from a first end of the airfoil portion to a second, opposite end of the dovetail portion and an axial plane substantially normal to the radial axis, and the airfoil portion, the transition portion, and dovetail portion may include a plurality of fibers extending substantially continuously from adjacent the first end to adjacent the second end. At least part of the platform portion may extend parallel to the axial plane, and the airfoil portion may define a capture feature that is configured to engage with and mechanically restrain the platform portion from moving beyond the capture feature toward the first end of the airfoil portion.

In some examples, the disclosure describes a system including a gas turbine engine disc defining at least one recesses shaped to receive the dovetail portion of a gas turbine engine blade. The system also may include a gas turbine engine blade including a dovetail portion comprising a first ceramic matrix composite, an airfoil portion comprising the first ceramic matrix composite, a transition portion between the airfoil portion and the dovetail portion, and a platform portion that substantially surrounds the transition portion. The gas turbine engine blade may define a radial axis extending from a first end of the airfoil portion to a second, opposite end of the dovetail portion and an axial plane substantially normal to the radial axis, and the airfoil portion, the transition portion, and dovetail portion may include a plurality of fibers extending substantially continuously from adjacent the first end to adjacent the second end. At least part of the platform portion may extend parallel to the axial plane, and the airfoil portion may define a capture feature that is configured to engage with and mechanically restrain the platform portion from moving beyond the capture feature toward the first end of the airfoil portion.

In some examples, the disclosure describes a method of forming a gas turbine engine blade. The gas turbine engine blade may include a dovetail portion comprising a first ceramic matrix composite, an airfoil portion comprising the first ceramic matrix composite, a transition portion between the airfoil portion and the dovetail portion, and a platform portion that substantially surrounds the transition portion. The gas turbine engine blade may define a radial axis extending from a first end of the airfoil portion to a second, opposite end of the dovetail portion and an axial plane substantially normal to the radial axis, and the airfoil portion, the transition portion, and dovetail portion may include a plurality of fibers extending substantially continuously from adjacent the first end to adjacent the second end. At least part of the platform portion may extend parallel to the axial plane, and the airfoil portion may define a capture feature that is configured to engage with and mechanically restrain the platform portion from moving beyond the capture feature toward the first end of the airfoil portion.

In some examples, the disclosure describes a method including assembling reinforcement material for an airfoil portion, a transition portion, a dovetail portion, and a platform portion of a gas turbine engine blade; exposing the assembled reinforcement material to chemical vapor infiltration to rigidize the assembled reinforcement material; performing slurry infiltration to introduce matrix material precursor into voids between the rigidized reinforcement material; and performing melt infiltration to form matrix material in the voids between the rigidized reinforcement material and form the gas turbine engine blade.

In some examples, the disclosure describes a method that includes forming an airfoil portion, a transition portion, and a dovetail portion of a gas turbine engine blade as a single CMC; forming a platform portion of the gas turbine engine blade in multiple parts; assembling the multiple parts of the platform portion around the transition portion; forming at least one additional restraint feature; and assembling the at least one additional restraint feature with the airfoil portion, the transition portion, the dovetail portion, and the platform portion of the gas turbine engine blade.

In some examples, the disclosure describes a method that includes assembling reinforcement material for the airfoil portion, the transition portion, and the dovetail portion; and exposing the assembled reinforcement material to chemical vapor infiltration to rigidize the assembled reinforcement material. The method also may include assembling reinforcement material for the platform portion and exposing the assembled reinforcement material to chemical vapor infiltration to rigidize the assembled reinforcement material. The method further may include performing slurry infiltration to introduce matrix material precursor into voids between the rigidized reinforcement material in the airfoil portion, the transition portion, the dovetail portion, and the platform portion; and performing melt infiltration to form matrix material in the voids between the rigidized reinforcement material and form a gas turbine engine blade.

The details of one or more examples are set forth in the accompanying drawings and the description below. Other features, objects, and advantages will be apparent from the description and drawings, and from the claims.

DETAILED DESCRIPTION

Figure 1:
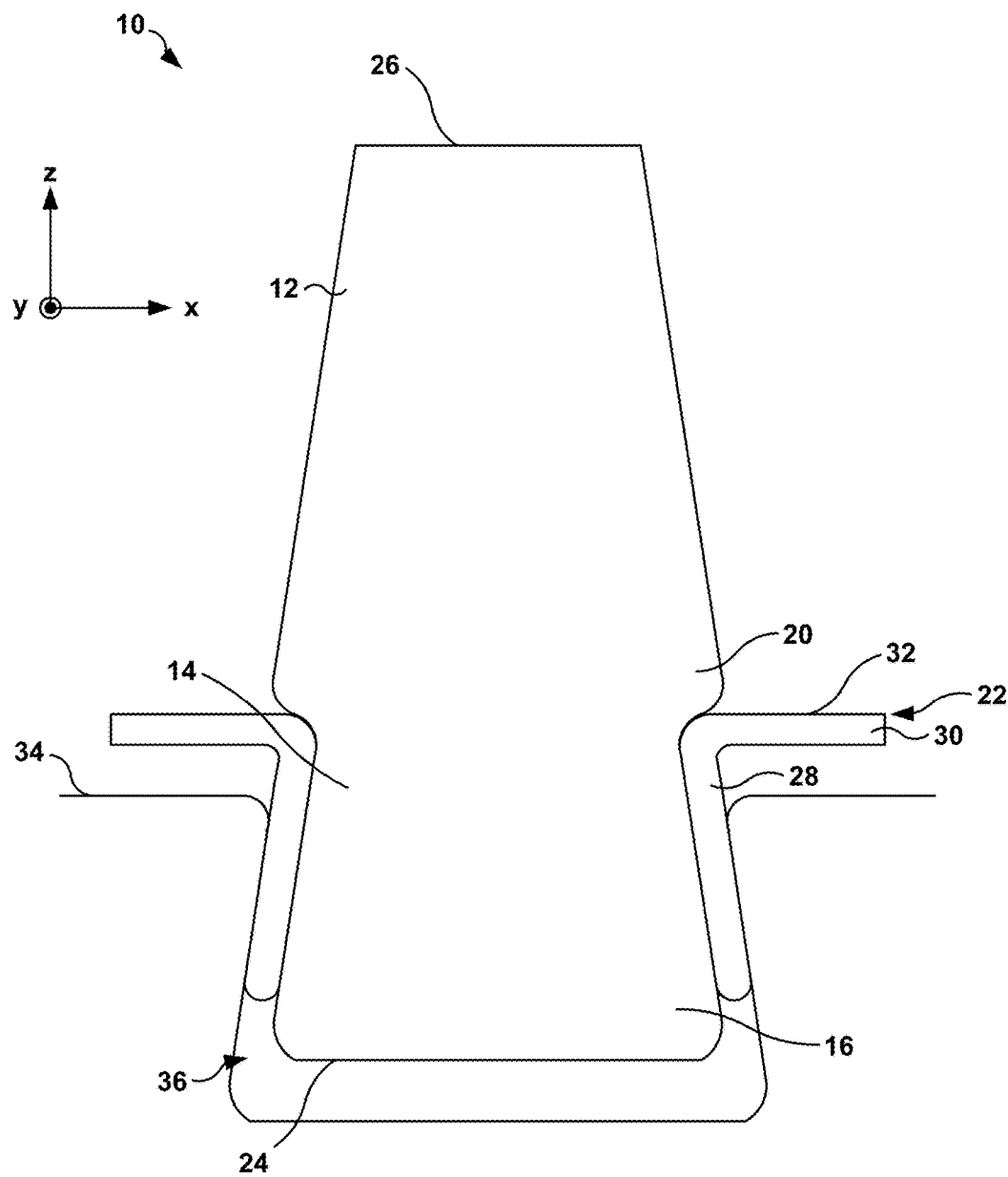
FIG. 1 is a conceptual diagram illustrating an example gas turbine engine blade including an airfoil portion that includes a capture feature.

The disclosure describes techniques for forming gas turbine engine blades from a ceramic matrix composite (CMC). CMCs may be useful in a variety of contexts where mechanical and thermal properties are important. In some examples, the properties of CMCs may be anisotropic, based on the construction of the CMC. For example, a CMC with a majority of uniaxial fibers may have high strength in the direction parallel to the length of the uniaxial fibers, but lower strength in other directions. Thus, the orientation of fibers within a CMC may be selected to provide mechanical properties in selected directions, e.g., based on the manner in which the CMC will be used.

During operation of a gas turbine engine, a gas turbine engine blade experiences high centrifugal forces in a radial direction substantially along the length of the gas turbine engine blade due to rotation of the blade. Because of this, in a CMC gas turbine engine blade, uniaxial fibers or laminate may be oriented substantially parallel to the radial length of the gas turbine engine blade.

A gas turbine engine blade may include an airfoil portion, a dovetail portion, and a transition portion that connects the airfoil portion and the dovetail portion. In accordance with one or more examples of this disclosure, a gas turbine engine blade may include a CMC that forms at least the airfoil, transition, and dovetail portions of the blade. A gas turbine engine blade also includes a platform portion, which defines the inner annulus of the flowpath of gases passing through the engine. The platform portion may substantially surround at least part of the transition portion. The surfaces that define the inner annulus may be orthogonal to the radial length of the gas turbine engine blade. When forming the platform portion, in some examples, the fibers in the CMC are oriented parallel to surface that forms the inner annulus of the flowpath, such that the fibers are oriented orthogonal to the radial length of the gas turbine engine blade (and orthogonal to the major forces applied to the blade during use). In some examples, the platform portion may be attached to the remainder of the gas turbine engine blade using lamination (e.g., by co-infiltration with a matrix material of the CMC), which results in the interlaminar bond holding the platform to the remainder of the gas turbine engine blade. The interlaminar bond may be relatively weak compared to the strength of the fibers in the axial direction of the fibers.

The airfoil portion may define at least one capture feature, which restrains movement of the platform portion toward the airfoil end of the gas turbine engine blade. In this way, in some examples, the capture feature provides additional restraint to the platform portion, in addition to the interlaminar bond between the platform portion and the transition portion. In other examples, the capture feature may restrain the platform portion relative to the transition portion without an interlaminar bond, and with or without additional restraint features. The additional restraint features may include, for example, a capture ring that surrounds part of the platform portion, one or more pins that extends through apertures in the platform portion into apertures in the transition portion, or the like. In this way, the capture feature may help hold the platform in place relative to the remainder of the gas turbine engine blade during use of the gas turbine engine.

FIG. 1 is a conceptual diagram illustrating an example gas turbine engine blade 10 including an airfoil 12 that includes a capture feature 20. Gas turbine engine blade 10 includes airfoil portion 12, a transition portion 14, and a dovetail portion 16.

Airfoil portion 12, transition portion 14, and dovetail portion 16 of gas turbine engine blade 10 may include a CMC. For example, airfoil portion 12, transition portion 14, and dovetail portion 16 may be formed of a silicon carbide-silicon carbide (SiC—SiC) CMC, which includes reinforcement material including SiC and a matrix material that includes SiC. The reinforcement material may be in the form of, for example, at least one of a three-dimensional weave, a two-dimensional fabric layup, a unidirectional tape layup, large unidirectional tows such as SCS fiber, or the like. In some examples, the matrix material may additionally or alternatively include, for example, silicon; the reinforcement material may additionally or alternatively include, for example, carbon; or both.

Figure 2:
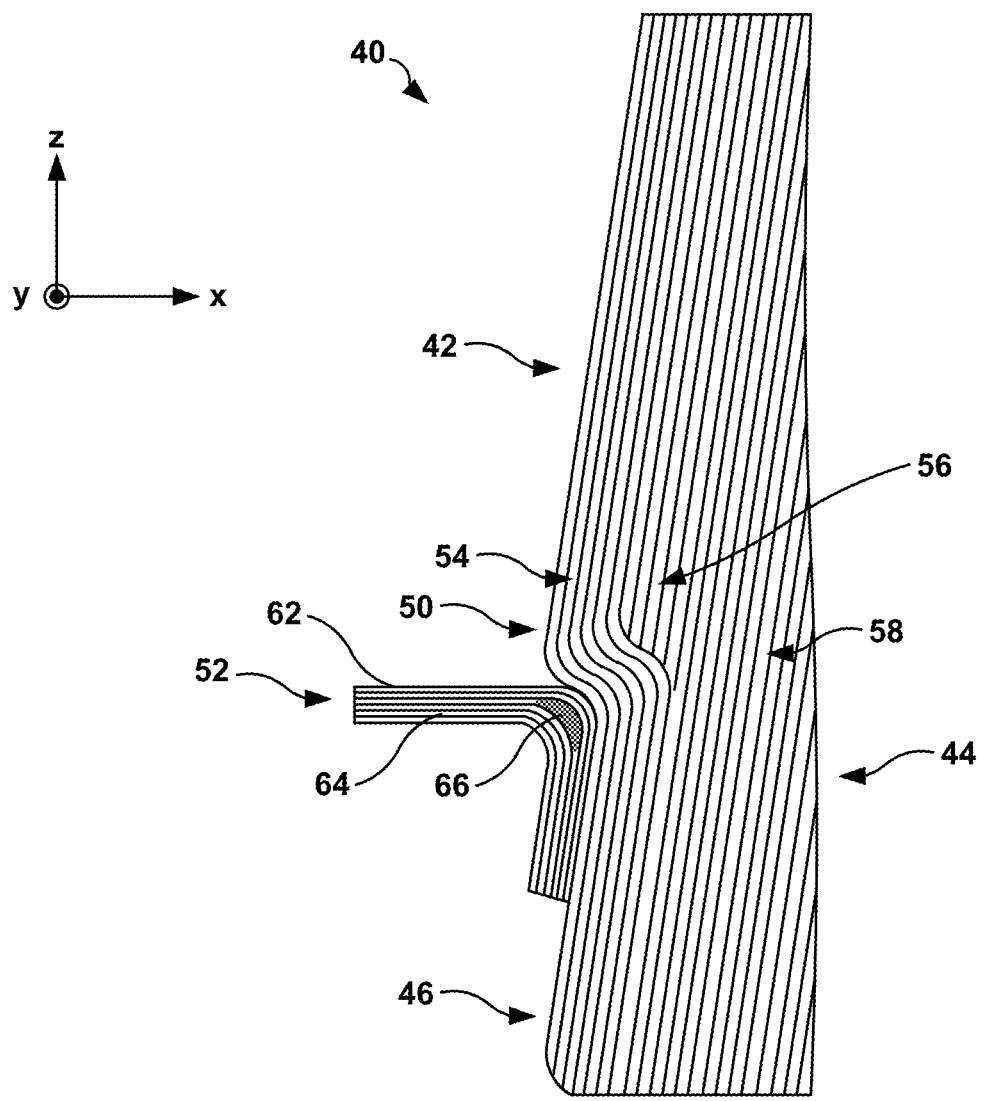
FIGS. 2 and 3 are conceptual diagrams illustrating example gas turbine engine blades including capture features formed using two different, example techniques.
Figure 3:
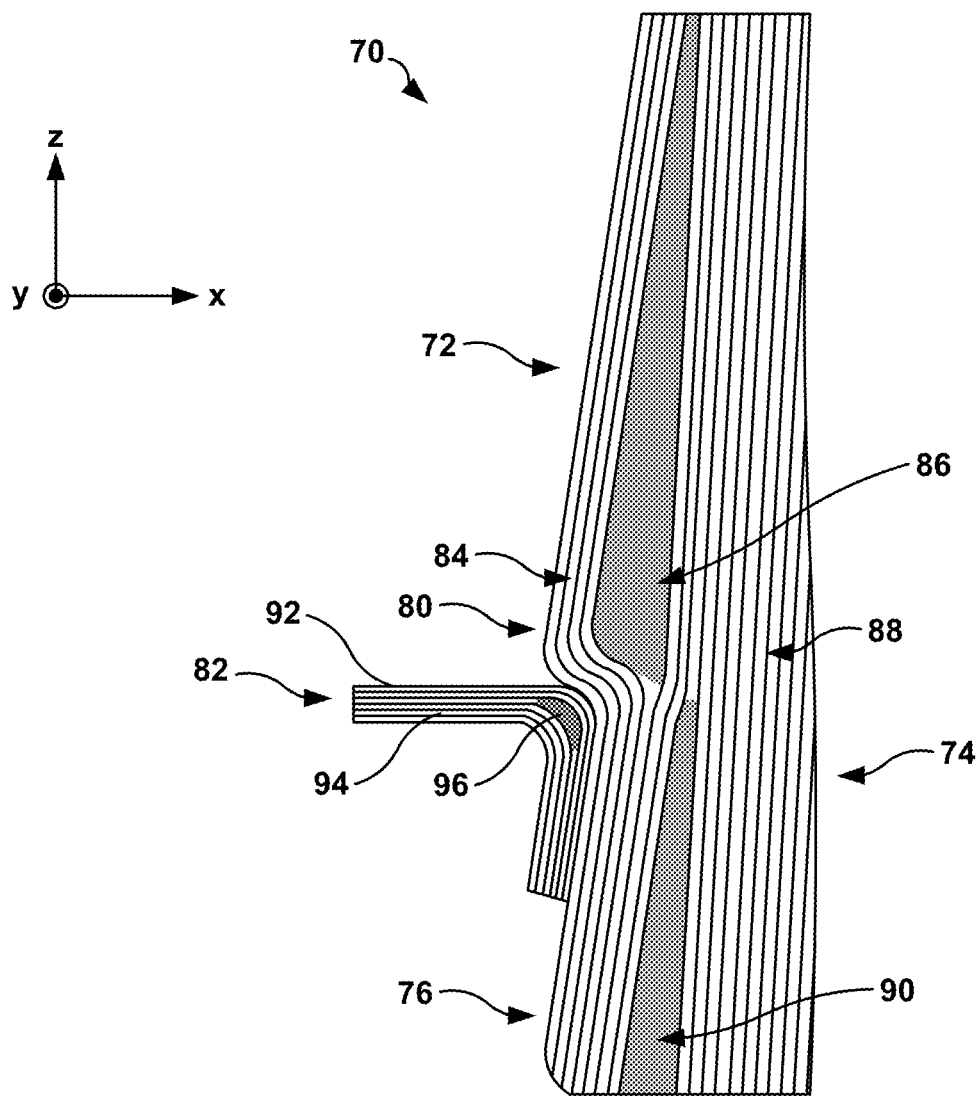

In some examples, as shown in FIG. 1, airfoil portion 12, transition portion 14, and dovetail portion 16 may be integral, i.e., may be formed as a single piece. For example, airfoil portion 12, transition portion 14, and dovetail portion 16 may include at least some reinforcement material, such as laminate, weave, fabric, tape, tows, or the like, which extends substantially continuously from adjacent to airfoil tip 26 (or first end 26) to dovetail end 24 (or second end 24). The substantially continuous reinforcement material extending from adjacent to airfoil tip 26 (or first end 26) to dovetail end 24 (or second end 24) may provide high strength to gas turbine engine blade 10 in the direction parallel to the x-axis shown in FIG. 1 (where orthogonal x-y-z axes are shown in FIG. 1 for purposes of description only). This direction may be referred to as the radial length of gas turbine engine blade 10, and the direction toward airfoil tip 26 may be referred to as the radially outer direction. Strength in the direction of the radial length of gas turbine engine blade 10 is important due to the centrifugal forces parallel to the z-axis experienced by gas turbine engine blade 10 during operation of the gas turbine engine in which gas turbine engine blade 10 is utilized. Although FIG. 1 does not illustrate substantially continuous reinforcement material extending from adjacent to airfoil tip 26 to dovetail end 24, FIGS. 2 and 3 are conceptual diagrams that illustrate gas turbine blades that include substantially continuous reinforcement material extending from adjacent to airfoil tip 26 to dovetail end 24.

Airfoil portion 12 is the portion of gas turbine engine blade 10 that is exposed to fluid during operation of the gas turbine engine, such as intake gases or exhaust gases. Dovetail portion 16 is the portion of gas turbine engine blade 10 that is restrained by a gas turbine engine disc 34. Dovetail portion 16 includes a shape that results in mechanical restraint of dovetail portion 16 by a corresponding recess formed in gas turbine engine disc 34. Transition portion 14 is between airfoil portion 12 and dovetail portion 16 and joins airfoil portion 12 and dovetail portion 16. Gas turbine engine disc 34 may be a disc connected to a shaft, which rotates to transfer energy to or from gas turbine engine disc 34. Gas turbine engine disc 34 includes a plurality of recesses shaped to receive a dovetail of a gas turbine engine blade 10, although only a single recess is illustrated in FIG. 1. In some examples, gas turbine engine disc 34 may be formed of a Ni-based superalloy.

Gas turbine engine blade 10 also includes a platform portion 22. Platform portion 22 substantially surrounds at least part of transition portion 14. Platform portion includes radially inner portion 28 and a radially outer portion 30. Radially inner portion 28 substantially surrounds at least part of transition portion 14 and contacts an external surface of transition portion 14. At the location at which radially outer portion 30 is adjacent to transition portion 14, radially outer portion 30 may extend generally orthogonal to the long (radial) axis of gas turbine engine blade 10 (generally orthogonal to the z-axis shown in FIG. 1) and generally parallel to an axial plane of gas turbine engine blade 10 (parallel to the x-y plane shown in FIG. 1). A surface 32 of radially outer portion 30 may be exposed to fluid flow (e.g., intake gases or exhaust gases) during use of gas turbine engine blade 10. In some examples, surface 32 may be substantially planar; may define a curved surface in one or more dimensions; such as an arc, a portion of a cylinder, or a portion of a cone; or the like.

In some examples, platform portion 22 includes a ceramic matrix composite. For example, platform portion 22 may include a reinforcement material and a matrix material. In some examples, the reinforcement material may be in the form of at least one of a three-dimensional weave, a two-dimensional fabric layup, a unidirectional tape layup, or the like. In some examples, platform portion 22 may include the same architecture (e.g., matrix material composition, reinforcement material composition, and reinforcement material type), as airfoil portion 12, transition portion 14, and dovetail portion 16. In other examples, platform portion 22 may include a different architecture (e.g., at least one of the matrix material composition, reinforcement material composition, or reinforcement material type), than airfoil portion 12, transition portion 14, and dovetail portion 16.

A platform portion 22 that includes a CMC may be formed as a single piece, e.g., laid up or wrapped around transition portion 14, or may be formed as at least two pieces that are assembled around transition portion 14, e.g., prior to slurry infiltration or melt infiltration.

In some examples, a platform portion 22 that includes a CMC may be co-processed with airfoil portion 12, transition portion 14, and dovetail portion 16 for at least part of the processing used to form the matrix of the CMC. For example, the reinforcement material for airfoil portion 12, transition portion 14, dovetail portion 16, and platform portion 22 may be laid up as a preform, e.g., in tooling that defines the shapes of the various portions, then the processing for infiltrating the preform with matrix material may be performed. This may result in matrix material extending continuous throughout airfoil portion 12, transition portion 14, dovetail portion 16, and platform portion 22, forming a unitary gas turbine engine blade 10.

In other examples, part of the processing may be performed separately for platform portion 22 and for airfoil portion 12, transition portion 14, and dovetail portion 16. For example, reinforcement material for airfoil portion 12, transition portion 14, and dovetail portion 16 may be laid up in a first tooling and exposed to chemical vapor infiltration to stiffen airfoil portion 12, transition portion 14, and dovetail portion 16. Separately, platform portion 22 (or multiple pieces of a platform portion 22) may be laid up in a second tooling and exposed to chemical vapor infiltration to stiffen platform portion 22. Platform portion 22 may then be assembled around transition portion 14 and the remaining processing steps (e.g., slurry infiltration and melt infiltration) may be performed to form matrix material in airfoil portion 12, transition portion 14, dovetail portion 16, and platform portion 22. This also may result in matrix material extending airfoil portion 12, transition portion 14, dovetail portion 16, and platform portion 22, forming a unitary gas turbine engine blade 10.

As another example, reinforcement material for airfoil portion 12, transition portion 14, and dovetail portion 16 may be laid up in a first tooling and processed to introduce the matrix material and form a first CMC including airfoil portion 12, transition portion 14, and dovetail portion 16. Separately, reinforcement material for platform portion 22 may be laid up in a second tooling process and processed to introduce the matrix material and form a second CMC including platform portion 22 (or multiple parts of platform portion 22). Platform portion 22 then may be assembled around transition portion 14.

In other examples, instead of including a CMC, platform portion 22 may include a metal or an alloy, such as a Co- or Ni-based superalloy. In some examples in which platform portion 22 includes a metal or alloy, platform portion 22 may include at least two separate pieces that are assembled around transition portion 14.

Airfoil portion 12 includes a capture feature 20. Capture feature 20 is located closer to airfoil tip 26 than transition portion 14 and at least part of platform portion 22 are to airfoil tip 26. Capture feature 20 engages with and mechanically restrains platform portion 22 from moving radially toward airfoil tip 26 beyond capture feature 20. Capture feature 20 extends further in the direction parallel to the axial plane (parallel to the x-y plane shown in FIG. 1) than adjacent portions of airfoil portion 12 and transition portion 14. In this way, capture feature 20 forms a mechanical stop that may prevent platform portion 22 from passing capture feature 20 in the direction toward airfoil tip 26.

In addition to capture feature 20, the shape and size of recess 36 of gas turbine engine disc 34 may be selected to engage with radially inner portion 28 of platform portion 22. For example, as shown in FIG. 1, the tapering of recess 36 may press radially inner portion 28 between gas turbine engine disc 34 and transition portion 14 as centrifugal forces urge gas turbine engine blade 10 in parallel to the z-axis direction of FIG. 1 during rotation of gas turbine engine disc 34 and gas turbine engine blade 10. Together with capture feature 20, which may substantially restrain platform portion 22 from moving toward airfoil tip 26 past capture feature 20.

Without capture feature 20, a platform portion 22 that includes a CMC may be attached to transition portion 14 using only matrix material, which may be referred to as an interlaminar bond. The interlaminar bond may be relatively weak compared to the strength of the fibers in the axial direction of the fibers. Thus, the interlaminar bond between transition portion 14 and platform portion 22 may be a likely failure location for gas turbine engine blade 10 without capture feature 20. By including capture feature 20 as a mechanical restraint, the likelihood of platform portion 22 moving relative to transition portion 14 may be reduced or substantially eliminated.

Capture feature 20 may be formed using one or more of a variety of techniques. FIGS. 2 and 3 are conceptual diagrams illustrating example gas turbine engine blades including capture features formed using two different, example techniques. FIG. 2 illustrates a gas turbine engine blade 40 that includes an airfoil portion 42, a transition portion 44, and a dovetail portion 46. Although not shown in FIG. 2, gas turbine engine blade 40 may be utilized with a gas turbine engine disc, such as gas turbine engine disc 34 shown in FIG. 1. As shown in FIG. 2, gas turbine engine blade 40 includes at least some fibers 54 and 58 that extend from adjacent to the tip of airfoil portion 42 to adjacent to the end of dovetail portion 46.

Airfoil portion 42 includes capture feature 50. In the example shown in FIG. 2, capture feature 50 may be formed using some fibers 54 that curve or bend to define capture feature 50, and some fibers 56 that end adjacent to the curve in fibers 54. In the example shown in FIG. 2, fibers 56 extend from adjacent to the tip of airfoil portion 42 to adjacent to capture feature 50. Fibers 56 fill the void that would otherwise be left due to the bend or curve in fibers 54. Fibers 54, 56, and 58 may be in the form of at least one of a two-dimensional fabric layup, a unidirectional tape layup, large unidirectional tows such as SCS fiber, or the like. Although not explicitly shown in FIG. 2, fibers 54, 56, and 58 are disposed within a matrix material, such as Si, SiC, C, or the like.

Gas turbine engine blade 40 also includes platform portion 52. As shown in FIG. 2, platform portion 52 may be formed using at least one of a two-dimensional fabric layup, a unidirectional tape layup, or the like. In the radially outer portion 64, the fibers may extend substantially parallel to the x-y plane (wherein orthogonal x-y-z axes are shown in FIG. 2 for purposes of description only). In other examples, platform portion 52 may be formed using a three-dimensional weave.

In some examples, as shown in FIG. 2, platform portion 52 may include fill 66, which helps define the shape and bend in platform portion 52. Fill 66 is positioned between layers of fiber, fabric, tape, or the like. In some examples, fill 66 may include at least one of matrix material; matrix material and chopped fibers; an insert formed from shaped or machined layers of fiber, fabric, tape, or the like; twisted or braided fibers; or the like. The shape of the bend in platform portion 52 may be selected and defined to engage with the bend or curve forming capture feature 50.

In other examples, platform portion 52 may omit fill 66, and instead may define a substantially constant thickness (e.g., defined by the layup of the fibers, fabric, tape, three-dimensional weave, or the like).

FIG. 3 is another conceptual diagram illustrating an example gas turbine engine blade 70 including a capture feature 80 formed using a different, example technique. Although not shown in FIG. 3, gas turbine engine blade 70 may be utilized with a gas turbine engine disc, such as gas turbine engine disc 34 shown in FIG. 1. Similar to gas turbine engine blade 40 illustrated in FIG. 2, gas turbine engine blade 70 includes an airfoil portion 72, a transition portion 74, and a dovetail portion 76. Airfoil portion 72, transition portion 74, and dovetail portion 76 include at least some fibers 84 and 88 that extend substantially continuously from adjacent to the tip of airfoil portion 72 to adjacent the end of dovetail portion 76. Also similar to gas turbine engine blade 40 illustrated in FIG. 2, gas turbine engine blade 70 includes a platform portion 82. Platform portion 82 may be similar to or substantially the same as platform portion 52 described with reference to FIG. 2. For example, platform portion 82 includes a radially outer portion 94 defining a surface 92 that is exposed to gases, and may include or omit fill 96.

Unlike gas turbine engine blade 40, gas turbine engine blade 70 includes fill 86 and 90. Fill 86 fills the void that would otherwise be present due to the bend in fibers 84, which defines capture feature 80. Fill 90 fills the void that otherwise may be present due to the shape of dovetail portion 76, and helps define the shape of dovetail portion 76. Similar to fill 66 described with respect to FIG. 2, fill 86 and 90 may be positioned between layers of fiber, fabric, tape, or the like. In some examples, fill 86 and 90 may include at least one of matrix material; matrix material and chopped fibers; an insert formed from shaped or machined layers of fiber, fabric, tape, or the like; twisted or braided fibers; or the like. Fill 86 and 90 may include the same or a different construction.

Figure 4:
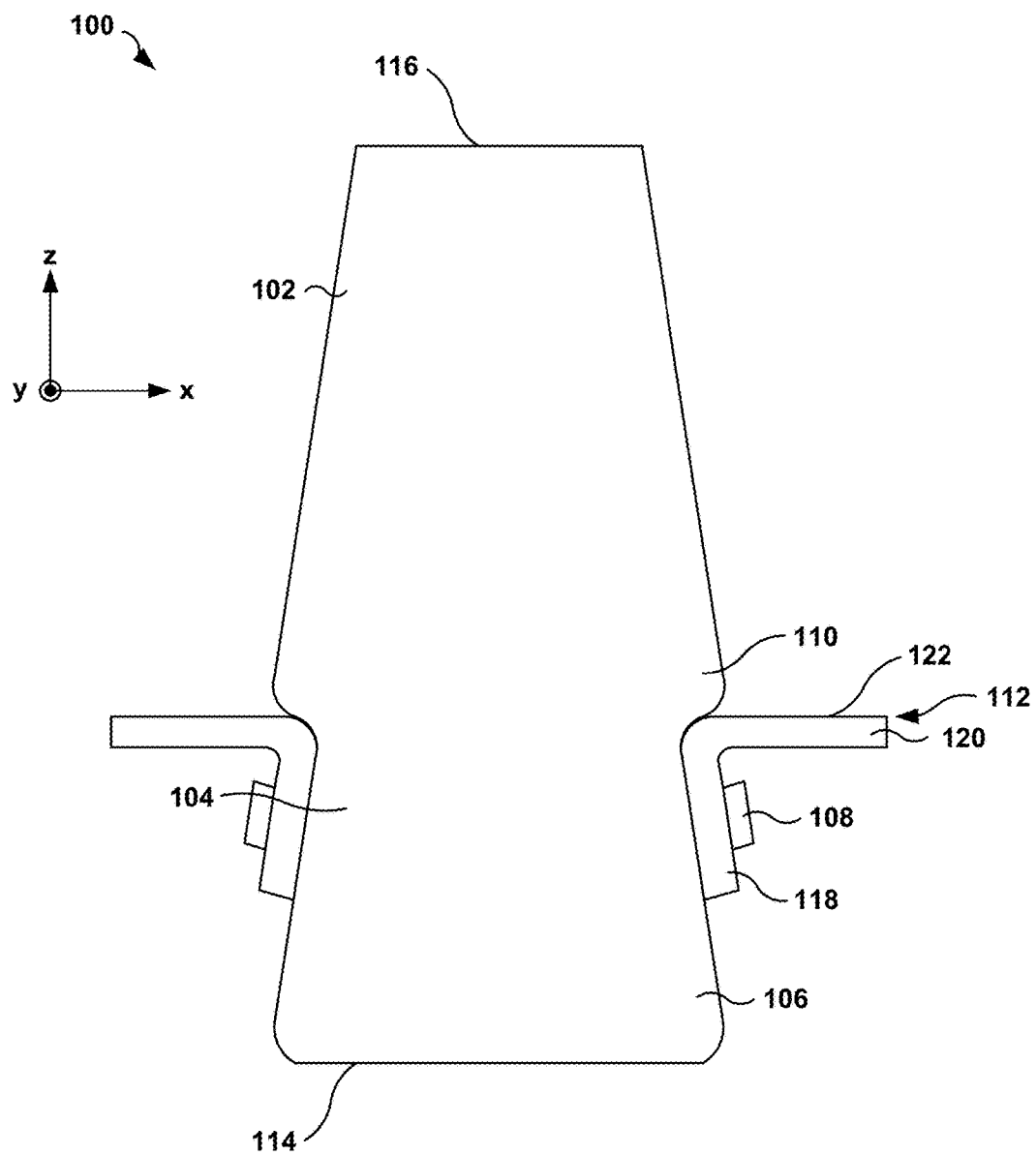
FIG. 4 is a conceptual diagram illustrating an example gas turbine engine blade that includes an airfoil portion including a capture feature, and a capture ring.

In some examples, a gas turbine engine blade may include at least one additional restraint feature, which, together with a capture feature, may restrain the platform portion relative to the remainder of the gas turbine engine blade. FIG. 4 is a conceptual diagram illustrating an example gas turbine engine blade 100 that includes an airfoil portion 102 including a capture feature 110, and a capture ring 108. Although not shown in FIG. 4, gas turbine engine blade 100 may be utilized with a gas turbine engine disc, such as gas turbine engine disc 34 shown in FIG. 1. Gas turbine engine blade 100 may be similar to or substantially the same as gas turbine engine blade 10 illustrated in and described with respect to FIG. 1, aside from the differences described herein.

Like gas turbine engine blade 10, gas turbine engine blade 100 includes an airfoil portion 102, a transition portion 104, a dovetail portion 106, and a platform portion 112. Also like gas turbine engine blade 10, gas turbine engine blade 100 includes an airfoil tip 116 and a dovetail end 114. Although not shown in FIG. 4, at least some reinforcement material may extend substantially continuously from adjacent to airfoil tip 116 to adjacent to dovetail end 114.

Similar to or substantially the same as platform portion 22 of FIG. 1, platform portion 112 includes a radially inner portion 118 and a radially outer portion 120. Radially outer portion 122 defines a surface 122 that, together with surfaces of other gas turbine engine blades, defines an inner annulus of the flow path of gases.

Unlike gas turbine engine blade 10 of FIG. 1, gas turbine engine blade 100 further includes a capture band 108. Capture band 108 wraps around at least part of radially inner portion 118 of platform portion 112. Capture band 108 exerts a force against radially inner portion 118 of platform portion 112 and prevents radially inner portion 118 of platform portion 112 from moving away from the surface of transition portion 114 in the x-y plane (where orthogonal x-y-z axes are shown in FIG. 4 for purposes of description only). In this way, in combination with the geometry of transition portion 104, capture feature 110, and dovetail portion 106, capture band 108 may reduce a likelihood or substantially prevent platform portion 112 from moving parallel to the z-axis direction of FIG. 4 (in the radial length direction of gas turbine engine blade 10).

In some examples, as shown in FIG. 4, capture band 108 may extend in the radially outward direction to contact a radially inward surface of radially outer portion 120 of platform portion 112. This contact between capture band 108 and the radially inward surface of radially outer portion 120 of platform portion 112 may reduce a likelihood that capture band 108 moves in the radial direction during operation of gas turbine engine blade 100, e.g., compared to examples in which capture band 108 does not contact the radially inward surface of radially outer portion 120 of platform portion 112.

Capture band 108 may include a CMC. In some examples, capture band 108 may be co-processed with platform portion 112, airfoil portion 102, transition portion 104, and dovetail portion 106 for at least part of the processing used to form the matrix of the CMC. For example, the reinforcement material for airfoil portion 102, transition portion 104, dovetail portion 106, platform portion 112, and capture band 108 may be laid up as a preform, e.g., in tooling that defines the shapes of the various portions, then the processing for infiltrating the preform with matrix material may be performed. This may result in matrix material extending continuous throughout airfoil portion 102, transition portion 104, dovetail portion 106, platform portion 112, and capture band 108, forming a unitary gas turbine engine blade 100.

In other examples, capture band 108 may not be co-processed with platform portion 112, airfoil portion 102, transition portion 104, and dovetail portion 106. Instead, platform portion 112, airfoil portion 102, transition portion 104, and dovetail portion 106 may be formed, e.g., using one or more of the techniques described with respect to FIG. 1. After forming platform portion 112, airfoil portion 102, transition portion 104, and dovetail portion 106, reinforcement material of capture band 108 may be laid up around radially inner portion 108 of platform portion 112. Matrix material then may be introduced around the reinforcement material of capture band 108 to form capture band 108 including a CMC.

Capture band 108 may include any CMC material that possesses sufficient hoop strength to resist movement of radially inner portion 118 away from the surface of transition portion 104. For example, capture band 108 may include reinforcement material that includes at least one of braided fibers, wound filaments, fabric, unidirectional tape laid up such that the long axes of the reinforcement material wrap around radially inner portion 118 of transition portion 104. In some examples, a braid may provide more open porosity in capture band 108, which may facilitate infiltration of capture band 108 with matrix material. Similar to the other portions of gas turbine engine blade 100, the reinforcement material may include, for example, at least one of SiC, silicon, or carbon, and the matrix material may include, for example, at least one of SiC, silicon, or carbon.

Figure 5:
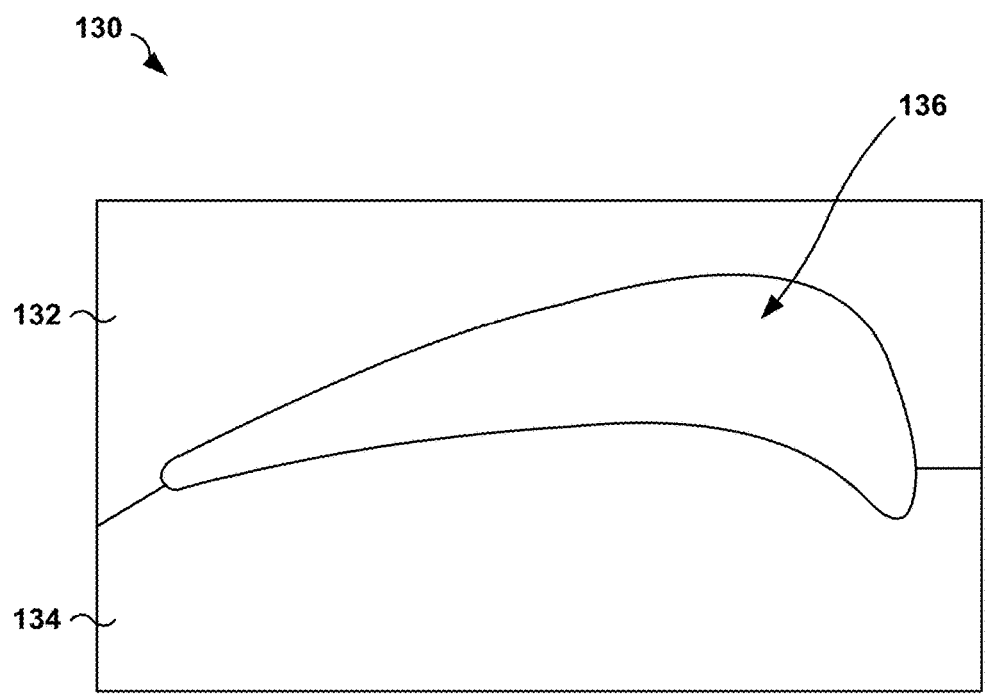
FIG. 5 is a conceptual diagram illustrating an example platform portion that is split into two parts.

As described briefly above, in some examples, the platform portion may include a single piece. In other examples, the platform portion may include multiple pieces or parts that are assembled around the transition portion of the gas turbine engine blade. FIG. 5 is a conceptual diagram illustrating an example platform portion 130 that is split into two parts. As shown in FIG. 5, platform portion 130 includes a first part 132 and a second part 134. Together, first part 132 and second part 134 define an aperture 136 that corresponds to the shape of the transition portion with which platform portion 130 will be assembled.

Although FIG. 5 illustrates platform portion 130 as including two parts 132 and 134, in other examples, platform portion 130 may include additional parts. In general, platform portion 130 may include at least one part or at least two parts.

Platform portion 130 may include, for example, a CMC, a metal, or an alloy, as described above. In examples in which platform portion 130 includes multiple parts, the multiple parts may be held together, for example, by a capture band (e.g., capture band 108 illustrated in FIG. 4).

Figure 6:
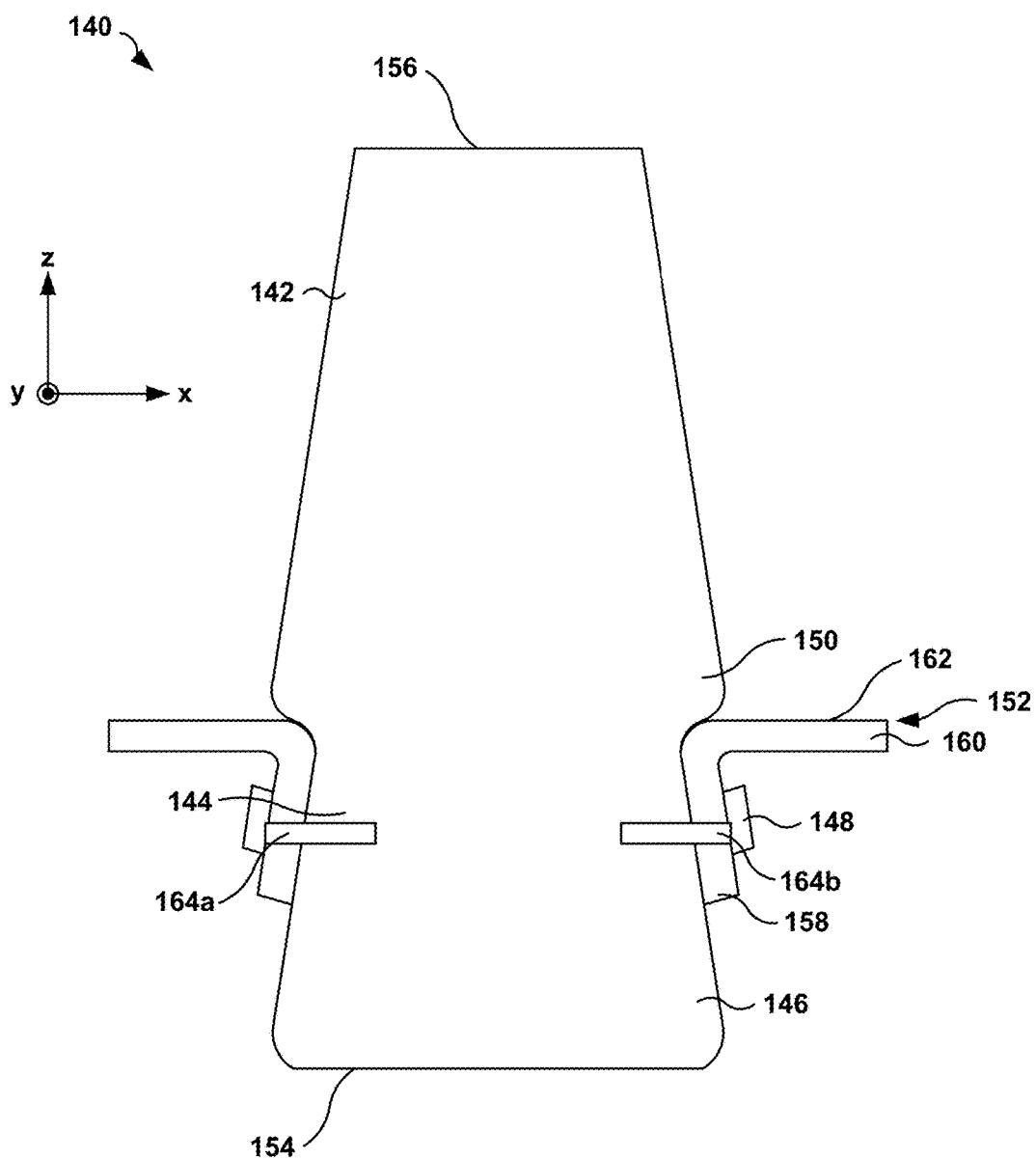
FIG. 6 is a conceptual diagram illustrating an example gas turbine engine blade that includes an airfoil portion including a capture feature, a capture ring, and multiple capture pins.

In some examples, one or more additional or alternative restraint features may be included in a gas turbine engine blade to restrain a platform portion relative to the transition portion, alone or in addition to a capture band. For example, FIG. 6 is a conceptual diagram illustrating an example gas turbine engine blade 140 that includes an airfoil portion 142 including a capture feature 150, a capture band 148, and multiple capture pins 164a and 164b (collectively, "capture pins 164"). Although not shown in FIG. 6, gas turbine engine blade 140 may be utilized with a gas turbine engine disc, such as gas turbine engine disc 34 shown in FIG. 1. In some examples, gas turbine engine blade 140 may be similar to or substantially the same as gas turbine engine blade 100 illustrated in and described with respect to FIG. 4, aside from the differences described herein.

For example, gas turbine engine 140 may include airfoil portion 142, transition portion 144, and dovetail portion 146, which may be formed as a single CMC, with at least some reinforcement material extending substantially continuously from adjacent to airfoil tip 156 to adjacent to dovetail end 154. Airfoil portion 142 may include a capture feature 150, which mechanically restrains platform portion 152 from moving past capture feature 150 toward airfoil tip 156.

Platform portion 152 includes a radially inner portion 158, which contacts transition portion 144, and a radially outer portion 160, which defines a surface 162 that is exposed to gases passing through the gas turbine engine during use of gas turbine engine blade 140. Similar to gas turbine engine blade 100 illustrated in and described with respect to FIG. 4, gas turbine engine blade 140 includes a capture band 148, which substantially surrounds part of radially inner portion 158 of platform portion 152, and holds radially inner portion 158 against transition portion 144. In some examples, platform portion 152 may include multiple parts or pieces, and capture band 148 also may hold the multiple parts or pieces of platform portion 152 together.

Additionally, gas turbine engine blade 140 includes capture pins 164a and 164b, which are disposed within respective apertures formed in transition portion 144 and radially inner portion 158 of platform portion 152. The respective apertures may be sized to receive respective ones of capture pins 164. In some examples, the apertures may be formed by cutting or omitting reinforcement material in the layup of transition portion 144 and platform portion 152. In some examples, the capture pins 164 are dowel pins and can help restrain platform portion 152 relative to transition portion 144 and transfer loads from platform portion 152 to transition portion 144.

In some examples, the capture pins 164 may include CMC capture pins. In some example implementations, capture pins 164 may be at least partially co-processed with the remainder of gas turbine engine blade 140. For example, the shape of capture pins 164 may be defined with reinforcement material (e.g., shaped or machined layers of fiber, fabric, tape, or the like; twisted or braided fibers; three-dimensional woven fibers; or the like), and exposed to chemical vapor infiltration to rigidize the reinforcement material. Respective capture pins 164 then may be inserted in respective apertures in platform portion 152 and transition portion 144. Airfoil portion 142, transition portion 144, dovetail portion 146, and platform portion 152 already may have been exposed to chemical vapor infiltration to rigidize the reinforcement material in these portions. In some examples, the capture band 148 also may be wrapped around at least part of radially inner portion 158 of platform portion 152, and may help restrain capture pins 164 in the apertures. The entire assembly then may be subjected to slurry infiltration and melt infiltration to form gas turbine engine blade 140.

In other examples, capture pins 164 may be fully formed as CMCs prior to positioning respective capture pins 164 in the respective apertures in platform portion 152 and transition portion 144.

In other examples, capture pins 164 may include a metal or metal alloy. In some such examples, the metallic or alloy capture pins 164 may be inserted into the respective apertures after melt infiltration of the remainder of gas turbine engine blade 140. For example, capture pins 164 may include a high nickel alloy spiral roll pin. Spiral roll pins may carry loads well in shear while providing radial compliance within the pin to reduce stresses due to differential thermal expansion.

In some examples, instead of including two capture pins, as illustrated in FIG. 6, gas turbine engine blade 140 may include more capture pins 164. In general, in some examples, gas turbine engine blade 140 may include multiple capture pins 164 (e.g., at least two capture pins 164). In some examples, capture pins 164 may be positioned approximately equally (or equidistantly) around the circumference of radially inner portion 158 of platform portion 152.

In some examples, in addition to or as an alternative to capture band 148 and/or capture pins 164, gas turbine engine blade 140 may include one or more layers of reinforcement material (e.g., a three-dimensional weave, a two-dimensional fabric, a unidirectional tape, or the like) laid up over capture feature 150 and contacting surface 162 of radially outer portion 160 of platform portion 152. In some examples, the one or more layers of reinforcement material may be co-processed with other parts of gas turbine engine blade, such that the one or more layers of reinforcement material help transfer loads from platform portion 152 to transition portion 144, airfoil portion 142, and dovetail portion 146.

Figure 7:
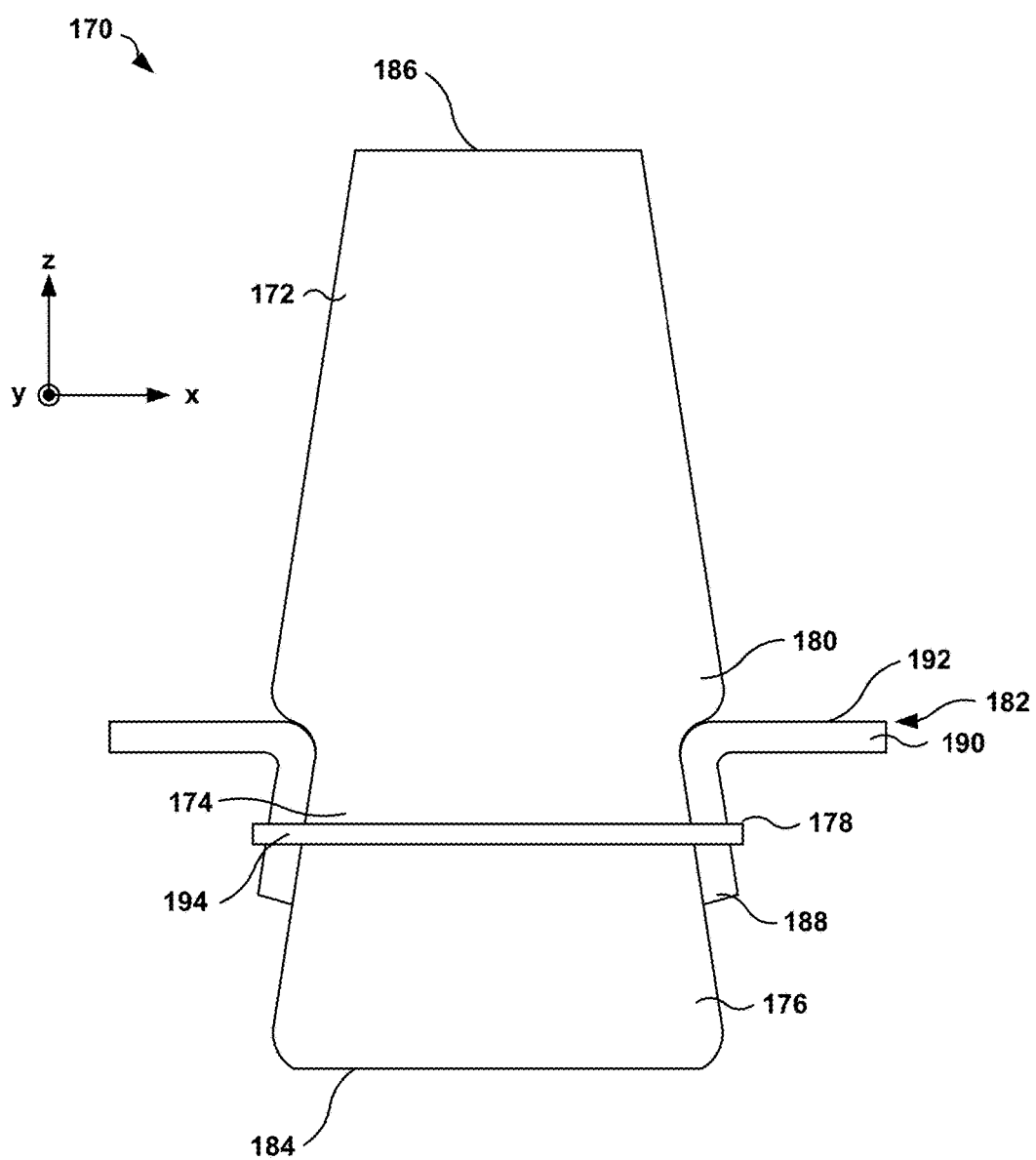
FIG. 7 is a conceptual diagram illustrating an example gas turbine engine blade that includes an airfoil portion including a capture feature, and a capture pin.

In some examples, instead of including multiple capture pins 164, a gas turbine engine may include a single capture pin. For example, FIG. 7 is a conceptual diagram illustrating an example gas turbine engine blade 170 that includes an airfoil portion 172 including a capture feature 150, and a capture pin 194. Although not shown in FIG. 7, gas turbine engine blade 170 may be utilized with a gas turbine engine disc, such as gas turbine engine disc 34 shown in FIG. 1. In some examples, gas turbine engine blade 170 may be similar to or substantially the same as gas turbine engine blade 140 illustrated in and described with respect to FIG. 6, aside from the differences described herein.

For example, gas turbine engine 170 may include airfoil portion 172, transition portion 174, and dovetail portion 176, which may be formed as a single CMC, with at least some reinforcement material extending substantially continuously from adjacent to airfoil tip 186 to adjacent to dovetail end 184. Airfoil portion 172 may include a capture feature 180, which mechanically restrains platform portion 182 from moving past capture feature 180 toward airfoil tip 186.

Platform portion 182 includes a radially inner portion 188, which contacts transition portion 174, and a radially outer portion 190, which defines a surface 192 that is exposed to gases passing through the gas turbine engine during use of gas turbine engine blade 170. In some examples, platform portion 182 may include multiple parts or pieces Additionally, gas turbine engine blade 170 includes a single capture pin 194, which is disposed within an apertures formed in transition portion 174 and respective apertures formed in radially inner portion 188 of platform portion 182. The respective apertures may be sized to receive capture pin 194. In some examples, the apertures may be formed by cutting or omitting reinforcement material in the layup of transition portion 174 and platform portion 182. In some examples, the capture pin 194 is a dowel pin and can help restrain platform portion 182 relative to transition portion 174 and transfer loads from platform portion 182 to transition portion 174.

Unlike gas turbine engine blade 140 illustrated in and described with respect to FIG. 6, gas turbine engine blade 170 may omit a capture band (e.g., capture band 148 of FIG. 6). In some examples, gas turbine engine blade 170 may include a capture band, or gas turbine engine blade 140 may omit capture band 148. In other words, single or multiple capture pins may be used with or without a capture band.

In some examples, capture pin 194 may include a CMC capture pin. In some example implementations, capture pin 194 may be at least partially co-processed with the remainder of gas turbine engine blade 170, as described above with respect to FIG. 6. In other examples, capture pin 194 may be fully formed as a CMC before positioning capture pin 194 in the respective apertures in platform portion 182 and transition portion 174.

Figure 8:
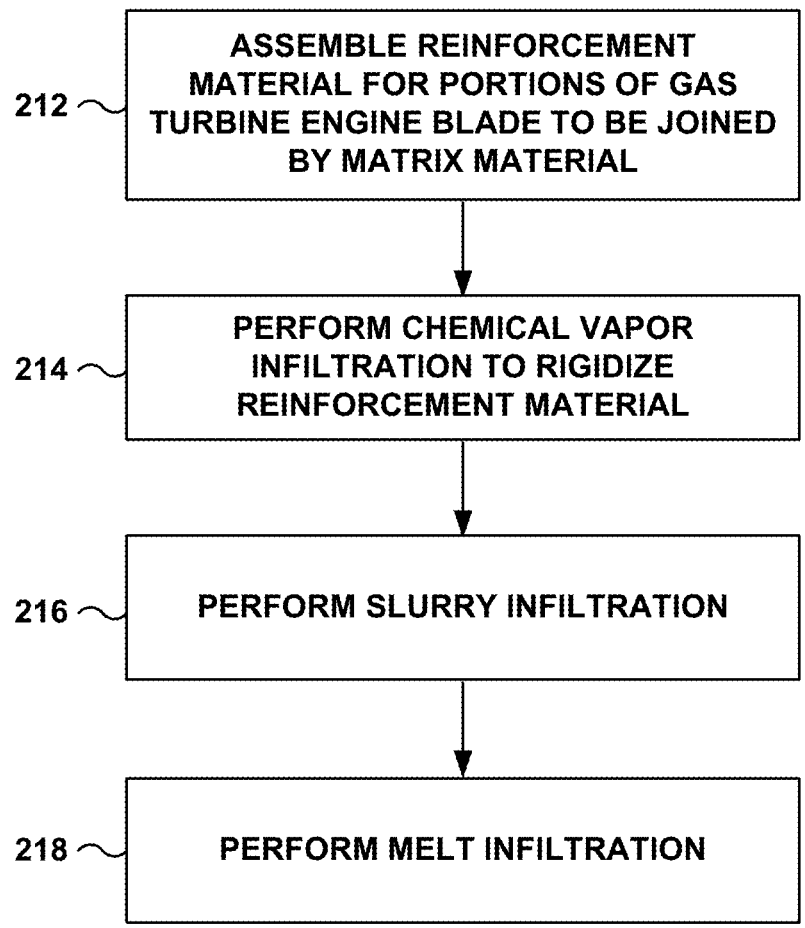
FIGS. 8-10 are flow diagrams illustrating example techniques for forming gas turbine engine blades including an airfoil portion that includes a capture feature.
Figure 9:
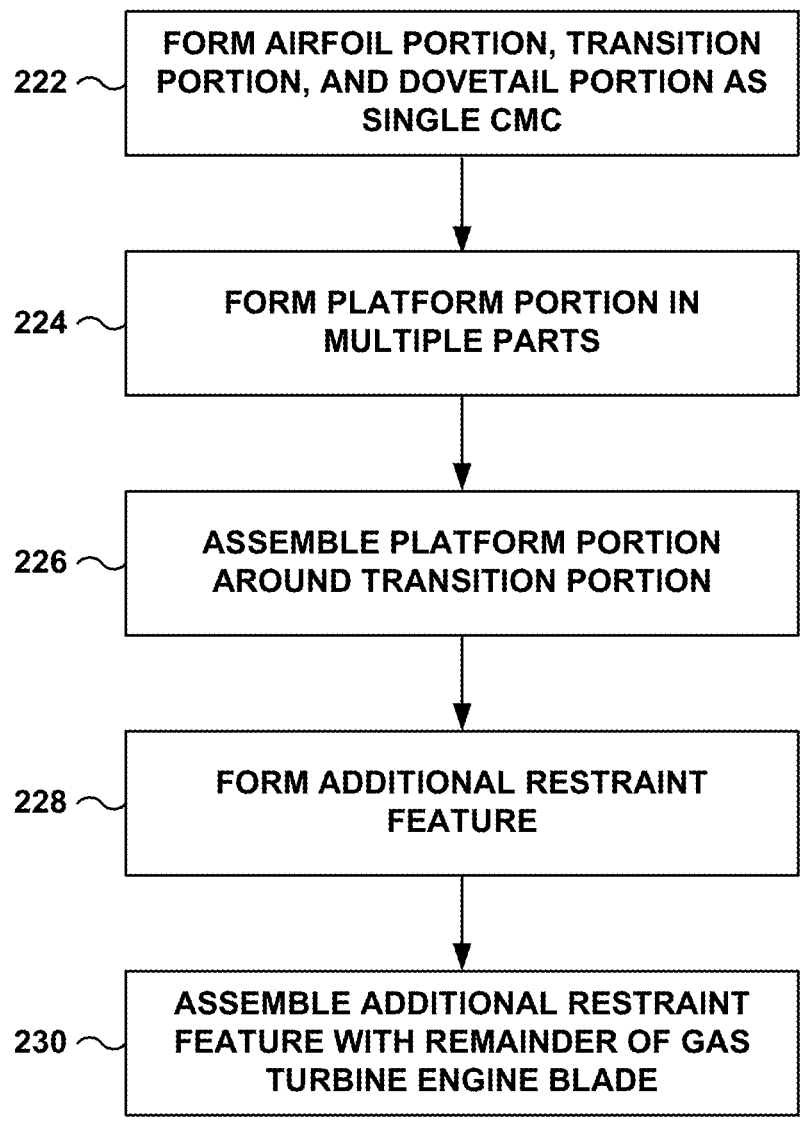
Figure 10:
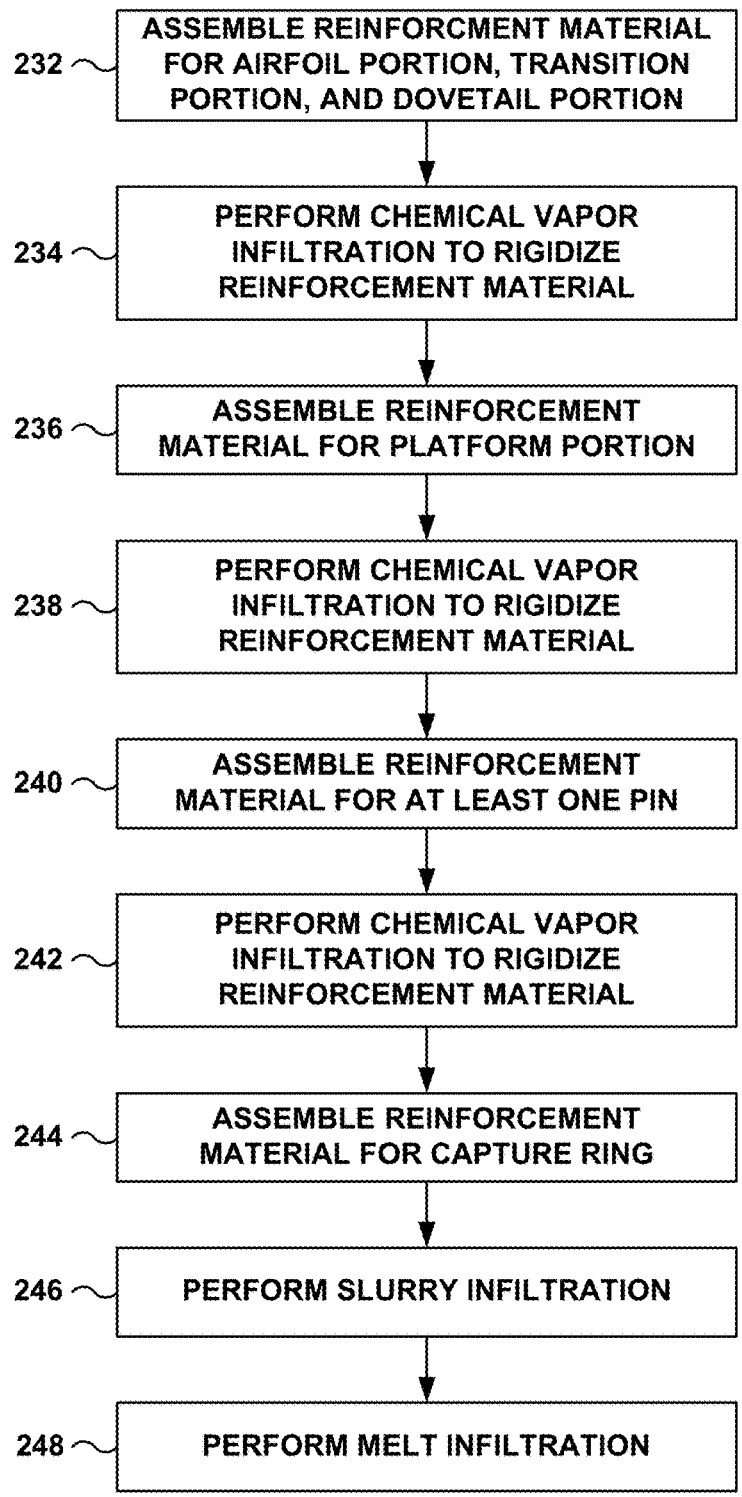

As described herein, gas turbine engine blades including a capture feature to help restrain a platform portion relative to an airfoil portion may be formed using any one of a variety of techniques. FIGS. 8-10 are flow diagrams illustrating example techniques for forming gas turbine engine blades including an airfoil portion that includes a capture feature.

The technique of FIG. 8 will be described with concurrent reference to the conceptual diagram of FIG. 1 for ease of illustration only. In other examples, the technique of FIG. 8 may be adapted to produce other gas turbine engine blades, such as other gas turbine engine blades described herein. Additionally or alternatively, gas turbine engine blade 10 may be formed using other techniques.

The technique of FIG. 8 includes assembling reinforcement material for portions of gas turbine engine blade 10 to be joined by matrix material (212). The portions of gas turbine engine blade 10 to be joined by matrix material may include at least airfoil portion 12, transition portion 14, and dovetail portion 16. In some examples, the portions of gas turbine engine blade 10 to be joined by matrix material additionally may additionally include at least one of platform portion 22, a capture band (e.g., capture band 108 of FIG. 4), or one or more capture pins (e.g., capture pins 164 of FIG. 6 or capture pin 194 of FIG. 7).

As described above, the reinforcement material used for each of airfoil portion 12, transition portion 14, dovetail portion 16, platform portion 22, a capture band, or one or more capture pins may be in one or more forms. In some examples, airfoil portion 12, transition portion 14, dovetail portion 16 may include at least some reinforcement material that extends substantially continuously (e.g., continuously or nearly continuously) from adjacent to airfoil tip 26 to adjacent to dovetail end 24. The reinforcement material for airfoil portion 12, transition portion 14, and dovetail portion 16 may be in the form of, for example, a three-dimensional weave, a two-dimensional fabric layup, a unidirectional tape layup, large unidirectional tows such as SCS fiber, or the like. In some examples, as illustrated in FIG. 2, some fibers 56 may end adjacent to capture feature 50 and help define the shape the shape of the capture feature 50. Alternatively or additionally, as shown in FIG. 3, airfoil portion 72, dovetail portion 76, or both may include fill 86 or 90, which may help define the shape of capture feature 80 and dovetail portion 76.

The reinforcement material for platform portion 22 may be in the form of at least one of a three-dimensional weave, a two-dimensional fabric layup, a unidirectional tape layup, or the like. In some examples, platform portion 22 may include the same architecture (e.g., reinforcement material composition and reinforcement material type), as airfoil portion 12, transition portion 14, and dovetail portion 16. In other examples, platform portion 22 may include a different architecture (e.g., at least one of reinforcement material composition or reinforcement material type), than airfoil portion 12, transition portion 14, and dovetail portion 16.

In examples in which the gas turbine engine blade includes additional restraint features, such as one or more capture pins or a capture band, these additional restraint features also may be assembled with airfoil portion 12, transition portion 14, dovetail portion 16, and platform portion 22. Additionally, in examples in which the gas turbine engine blade includes one or more capture pins, apertures may be formed in platform portion 22 and transition portion 14 at locations at which the one or more capture pins will be inserted.

In some examples, assembling reinforcement material for portions of gas turbine engine blade 10 to be joined by matrix material (212) may utilize tooling, such as a mold, which helps define the shape of the various portions of gas turbine engine blade 10.

In some examples, the technique of FIG. 8 also optionally includes performing chemical vapor infiltration to rigidize the laid up reinforcement material (214). Chemical vapor infiltration may be used to deposit a relatively thin layer of rigid material on the surface of the reinforcement material. The relatively thin layer of rigid material may connect adjacent fibers of the reinforcement material, to hold the reinforcement material together during subsequent processing, including slurry infiltration and melt infiltration. In some examples, the rigid material may include carbon, silicon carbide, or the like.

The technique of FIG. 8 also includes performing slurry infiltration (216) to deposit a slurry within voids between assembled reinforcement material. The slurry may include precursor to the matrix material to be formed. In some examples, the slurry may include matrix material precursor, a solvent, and, optionally, one or more additives. For example, the solvent may include water, ethanol, isopropyl alcohol, methyl ethyl ketone, toluene, or the like. The optional additives may include, for example, a binder (e.g. polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like. The matrix material precursor may include, for example, silicon carbide particles or a carbon source. In some examples, the matrix material precursor may react with silicon or silicon alloy during the melt infiltration process to form the matrix of the CMC. In some examples, at least some of the matrix material precursor remains unreacted and forms a particulate within the matrix of the CMC.

Regardless of the composition of the slurry, slurry infiltration may be performed (216) to deposit the slurry within voids between assembled reinforcement material. The slurry may substantially fill the voids between assembled reinforcement material. In some examples, prior to impregnation (and after the optional chemical vapor infiltration step), the preform fibers may optionally be prepared for slurry infiltration by exposing the fibers to a solution including, for example, water, solvents, surfactants, or the like aid impregnation of the fibers. A vacuum may optionally be drawn prior to slurry introduction to purge gas from the assembled reinforcement material and further enhance impregnation. The slurry infiltration may be conducted at any suitable temperature, including room temperature (between about 20° C. and about 35° C.). The slurry infiltration may be enhanced by application of external pressure after slurry introduction, such as a pressure gradient of about one atmosphere.

In some examples, after the slurry is infiltrated into voids within the assembled reinforcement material (216), excess slurry is optionally removed from the impregnated preform. The excess slurry can be removed from the impregnated preform by any suitable method, including mechanical surface treatment techniques like brushing or polishing with an abrasive article.

After the slurry is infiltrated into voids within the assembled reinforcement material (216), the resulting impregnated preform is at least partially dried to remove the solvent and form a greenbody preform. The drying may be conducted in any suitable manner, and in various examples, the impregnated preform can be dried at room temperature under vacuum at about 1 Torr, or may be dried at ambient pressure at a temperature of up to about 150° C.

The technique of FIG. 8 also includes infiltrating the greenbody preform with a molten infiltrant to form a matrix material within voids between the assembled reinforcement material (218). The molten infiltrant may include a molten metal alloy infiltrant. The molten metal alloy infiltrant wicks between the ceramic particles in the green composite article and occupies the interstices between the particles until the green composite article is fully densified to less than about 5%, or less than about 3%, or less than about 1%, porosity to form a composite article. In some examples, the metal alloy infiltrant may include Si, B, Al, Y, Ti, Zr, oxides thereof, and mixtures and combinations thereof.

In various embodiments, the temperature for metal alloy infiltration such as Si is about 1400° C. to about 1500° C. Under these conditions, the duration of the infiltration can be between about 15 minutes and about 4 hours, or between about 60 minutes and about 20 minutes. The infiltration process can optionally be carried out under vacuum, but in other examples can be carried out in inert gas under atmospheric pressure to limit evaporation losses.

The slurry infiltration (216) and melt infiltration (218) steps may result in matrix material that extends throughout the assembled portions of gas turbine engine blade 10. For example, in examples in which assembling reinforcement material for portions of gas turbine engine blade 10 to be joined by matrix material (212) includes assembling reinforcement material for airfoil portion 12, transition portion 14, dovetail portion 16, platform portion 22, and a capture band (e.g., capture band 108 shown in FIG. 4), the matrix material may extend substantially continuously throughout airfoil portion 12, transition portion 14, dovetail portion 16, platform portion 22, and the capture band. This results in airfoil portion 12, transition portion 14, dovetail portion 16, platform portion 22, and the capture band being substantially unitary, and may increase strength of gas turbine engine blade 10, e.g., compare to a blade 10 in which matrix material does not extend substantially continuously throughout airfoil portion 12, transition portion 14, dovetail portion 16, platform portion 22, and the capture band.

FIG. 9 is another flow diagram illustrating a different technique for forming a gas turbine engine blade including a capture feature. The technique of FIG. 9 will be described with concurrent reference to FIG. 4. However, in other examples, the technique of FIG. 9 may be used to form a different gas turbine blade, such as the gas turbine engine blades illustrated in FIGS. 6 and 7.

The technique of FIG. 9 includes forming airfoil portion 102, transition portion 104, and dovetail portion 106 as a single CMC (222). In some examples, forming airfoil portion 102, transition portion 104, and dovetail portion 106 as a single CMC (222) may include assembling the reinforcement material for airfoil portion 102, transition portion 104, and dovetail portion 106, e.g., using tooling such as a mold, exposing the assembled reinforcement material to a chemical vapor infiltration technique to rigidize the assembled reinforcement material, infiltrating rigidized reinforcement material with a slurry including a matrix material precursor, and melt infiltrating the slurry-infiltrated reinforcement material with a molten metal. These steps may be similar to or substantially the same as steps described above with respect to FIG. 8.

The technique of FIG. 9 may include separately forming platform portion 112 in multiple parts (224). In some examples, platform portion 112 may include a metal or alloy, and forming platform portion 112 in multiple parts (224) may include casting, forging, or the like, platform portion 112 in multiple parts. When assembled the multiple parts of platform portion 112 may substantially surround transition portion 104.

In other examples, platform portion 112 may include a CMC. In some examples in which platform portion 112 includes a CMC, forming platform portion 112 in multiple parts (224) may include assembling the reinforcement material for the multiple parts of platform portion 112, e.g., using tooling such as a mold, exposing the assembled reinforcement material to a chemical vapor infiltration technique to rigidize the assembled reinforcement material, infiltrating rigidized reinforcement material with a slurry including a matrix material precursor, and melt infiltrating the slurry-infiltrated reinforcement material with a molten metal. These steps may be similar to or substantially the same as steps described above with respect to FIG. 8.

The technique of FIG. 9 also may include assembling the multiple parts of platform portion 112 around transition portion 104 (226). In some examples, the multiple parts of platform portion 112 may be assembled around transition portion 104 (226) with the assistance of tooling, which may define the positioning of the multiple parts of platform portion 112 relative to transition portion 104.

The technique of FIG. 9 further may include forming at least one additional restraint feature for restraining platform portion 112 relative to transition portion 104 (228). As described above, in some examples, the at least one additional restraint feature may include a capture band, at least one capture pin that is inserted in apertures formed in platform portion 112 and transition portion 104, or the like.

In some examples, the at least one additional restraint feature may include a capture band 108, as shown in FIG. 4. In some such examples, forming at least one additional restraint feature for restraining platform portion 112 relative to transition portion 104 (228) may include laying up the reinforcement material of capture band 108 around at least part of radially inner portion 118 of platform portion 112. As described above, the reinforcement material of capture band 108 may include at least one of braided fibers, wound filaments, fabric, unidirectional tape laid up such that the long axes of the reinforcement material wrap around radially inner portion 118 of transition portion 104. forming at least one additional restraint feature for restraining platform portion 112 relative to transition portion 104 (228) also may include forming matrix material in capture band 108, e.g., using chemical vapor infiltration, slurry infiltration, and melt infiltration, similar to steps (214)-(218) of FIG. 8. The process of laying up the reinforcement material of capture band 108 around at least part of radially inner portion 118 of platform portion 112 and forming matrix material in capture band 108 may constitute assembling capture band 108 with the remainder of gas turbine engine blade 100 (230).

In some examples, the at least one additional restraint feature may include one or more capture pins, such as capture pins 164 shown in FIG. 6 or capture pin 194 shown in FIG. 7. In some examples, capture pins 164 or 194 may be formed by defining the shape of pins 164 or 194 with reinforcement material (e.g., shaped or machined layers of fiber, fabric, tape, or the like; twisted or braided fibers; three-dimensional woven fibers; or the like), exposing exposed the reinforcement material to chemical vapor infiltration to rigidize the reinforcement material, and subjecting the rigidized reinforcement material to slurry infiltration and melt infiltration to form matrix material. The one or more pins 164 or 194 then may be inserted in the aperture or apertures defined in platform portion 112 and transition portion 104 (230).

In some examples, such as the example shown in FIG. 6, a gas turbine engine blade 140 may include both one or more capture pins 164 and a capture band 148.

FIG. 10 is another flow diagram illustrating a different technique for forming a gas turbine engine blade including a capture feature. The technique of FIG. 10 will be described with concurrent reference to FIG. 6. However, in other examples, the technique of FIG. 10 may be used to form a different gas turbine blade.

The technique of FIG. 10 may include assembling reinforcement material for the airfoil portion, the transition portion, and the dovetail portion (232). This step may be similar to step (212) of FIG. 8. The technique of FIG. 10 also may include exposing the assembled reinforcement material to chemical vapor infiltration to rigidize the assembled reinforcement material (234). This step may be similar to step (214) of FIG. 8.

The technique of FIG. 10 further may include assembling reinforcement material for the platform portion (236), and exposing the assembled reinforcement material to chemical vapor infiltration to rigidize the assembled reinforcement material (238). These steps may be similar to steps (212) and (214) of FIG. 8.

In some examples, the technique of FIG. 10 additionally may include assembling reinforcement material for at least one pin (240) and exposing the assembled reinforcement material to chemical vapor infiltration to rigidize the assembled reinforcement material (242). This step may be similar to steps (228) and (230) described with reference to FIG. 9.

In some examples, the technique of FIG. 10 additionally may include assembling reinforcement material for a capture band (244) and exposing the assembled reinforcement material to chemical vapor infiltration to rigidize the assembled reinforcement material (246). This step may be similar to steps (228) and (230) described with reference to FIG. 9.

The technique of FIG. 10 further may include performing slurry infiltration to introduce matrix material precursor into voids between the rigidized reinforcement material in the airfoil portion, the transition portion, the dovetail portion, and the platform portion (246) and performing melt infiltration to form matrix material in the voids between the rigidized reinforcement material and form a gas turbine engine blade (248). These steps may be similar to steps (216) and (218) described with reference to FIG. 8. In the technique of FIG. 10, portions of the gas turbine engine blade may be partially co-processed such that matrix material may extend substantially continuously throughout the various portions of the gas turbine blade.

Various examples have been described. These and other examples are within the scope of the following claims.

What is claimed is:

1. A gas turbine engine blade comprising:
    a dovetail portion comprising a first ceramic matrix composite;
    an airfoil portion comprising the first ceramic matrix composite, wherein the gas turbine engine blade defines a radial axis extending from a first end of the airfoil portion to a second, opposite end of the dovetail portion and an axial plane substantially normal to the radial axis;
    a transition portion between the airfoil portion and the dovetail portion, wherein the airfoil portion, the transition portion, and the dovetail portion comprise a plurality of fibers extending substantially continuously from adjacent the first end to adjacent the second end; and
    a platform portion that substantially surrounds the transition portion, wherein at least part of the platform portion extends parallel to the axial plane, and wherein the airfoil portion defines a capture feature that is configured to engage with and mechanically restrain the platform portion from moving beyond the capture feature toward the first end of the airfoil portion.

2. The gas turbine engine blade of claim 1, wherein the capture feature is located closer to the first end of the airfoil than at least part of the platform portion, and wherein the capture feature extends further in a direction parallel to the axial plane than an adjacent part of the transition portion.

3. The gas turbine engine blade of claim 1, wherein the dovetail portion, the transition portion, and the airfoil portion comprise a single three-dimensional weave architecture, a single two-dimensional fabric architecture, or a single unidirectional tape architecture.

4. The gas turbine engine blade of claim 3, wherein the platform portion comprises a second, separate architecture.

5. The gas turbine engine blade of claim 1, wherein the capture feature comprises at least one of a bend parallel to the axial plane in at least some substantially radially extending fibers of the plurality of substantially radially extending fibers or a composite filler between respective substantially radially extending fibers of the plurality of substantially radially extending fibers.

6. The gas turbine engine blade of claim 1, wherein the plurality of substantially radially extending fibers comprises a first plurality of substantially radially extending fibers, further comprising a second plurality of substantially radially extending fibers that extend from adjacent to the first end of the airfoil portion and end adjacent to the capture feature.

7. The gas turbine engine blade of claim 1, wherein the platform portion comprises a first platform portion and a second platform portion, wherein the first platform portion is disposed on a pressure side of the gas turbine engine blade and the second platform portion is disposed on a suction side of the gas turbine engine blade, and wherein the first and second platform portions together substantially surround the transition portion.

8. The gas turbine engine blade of claim 1, wherein the airfoil portion, the transition portion, the dovetail portion, and the platform portion are co-processed such that matrix material extends through the airfoil portion, the transition portion, the dovetail portion, and the platform portion and integrally joins the airfoil portion, the transition portion, the dovetail portion, and the platform portion.

9. The gas turbine engine blade of claim 1, wherein the airfoil portion, the transition portion, and the dovetail portion are co-processed such that matrix material extends through the airfoil portion, the transition portion, and the dovetail portion and integrally joins the airfoil portion, the transition portion, and the dovetail portion, and wherein the platform portion is separately processed such that it is not integrally joined to the airfoil portion, the transition portion, and the dovetail portion with matrix material.

10. The gas turbine engine blade of claim 9, wherein the platform portion comprises at least one of a ceramic matrix composite, a metal, or an alloy.

11. The gas turbine engine blade of claim 1, further comprising a capture band substantially surrounding part of the platform portion, wherein the capture band comprises a braid architecture, a filament architecture, a two-dimensional fabric architecture, or a single unidirectional tape architecture.

12. The gas turbine engine blade of claim 11, wherein the airfoil portion, the transition portion, the dovetail portion, the platform portion, and the capture band are co-processed such that matrix material extends through the airfoil portion, the transition portion, the dovetail portion, the platform portion, and the capture band and integrally joins the airfoil portion, the transition portion, the dovetail portion, the platform portion, and the pin capture band.

13. The gas turbine engine blade of claim 1, wherein the transition portion defines a first aperture, wherein the platform portion defines a second aperture substantially aligned with the first aperture, and wherein the gas turbine engine blade further comprises a pin disposed in the first aperture and the second aperture.

14. The gas turbine engine blade of claim 13, wherein the airfoil portion, the transition portion, the dovetail portion, the platform portion, and the pin are co-processed such that matrix material extends through the airfoil portion, the transition portion, the dovetail portion, the platform portion, and the pin and integrally joins the airfoil portion, the transition portion, the dovetail portion, the platform portion, and the pin.

15. A system comprising:
    a gas turbine engine blade comprising:
        a dovetail portion comprising a first ceramic matrix composite;
        an airfoil portion comprising the first ceramic matrix composite, wherein the gas turbine engine blade defines a radial axis extending from a first end of the airfoil portion to a second, opposite end of the dovetail portion and an axial plane substantially normal to the radial axis;
        a transition portion between the airfoil portion and the dovetail portion, wherein the airfoil portion, the transition portion, and the dovetail portion comprise a plurality of fibers extending substantially continuously from adjacent the first end to adjacent the second end; and
        a platform portion that substantially surrounds the transition portion, wherein at least part of the platform portion extends parallel to the axial plane, and wherein the airfoil portion defines a capture feature that is configured to engage with and mechanically restrain the platform portion from moving beyond the capture feature toward the first end of the airfoil portion; and a gas turbine engine disc defining at least one recess shaped to receive the dovetail portion.

16. A method comprising:

assembling reinforcement material for an airfoil portion, a transition portion, and a dovetail portion of a gas turbine engine blade, wherein the gas turbine engine blade defines a radial axis extending from a first end of the airfoil portion to a second, opposite end of the dovetail portion and an axial plane substantially normal to the radial axis, and wherein the airfoil portion, the transition portion, and the dovetail portion comprise a plurality of fibers extending substantially continuously from adjacent the first end to adjacent the second end;

exposing the assembled reinforcement material to chemical vapor infiltration to rigidize the assembled reinforcement material;

assembling reinforcement material for a platform portion;

exposing the assembled reinforcement material to chemical vapor infiltration to rigidize the assembled reinforcement material;

performing slurry infiltration to introduce matrix material precursor into voids between the rigidized reinforcement material in the airfoil portion, the transition portion, the dovetail portion, and the platform portion, wherein airfoil portion defines a capture feature that is configured to engage with and mechanically restrain the platform portion from moving beyond the capture feature toward the first end of the airfoil portion; and performing melt infiltration to form matrix material in the voids between the rigidized reinforcement material and form a gas turbine engine blade.

17. The method of claim 16, further comprising:

assembling at least one of braided fibers, wound filaments, fabric, unidirectional tape to define the shape of a capture pin; and exposing the at least one of braided fibers, wound filaments, fabric, unidirectional tape to chemical vapor infiltration to rigidize the at least one of braided fibers, wound filaments, fabric, unidirectional tape, and wherein performing slurry infiltration to introduce matrix material precursor into voids between the rigidized reinforcement material in the airfoil portion, the transition portion, the dovetail portion, and the platform portion comprises performing slurry infiltration to introduce matrix material precursor into voids between the rigidized reinforcement material in the airfoil portion, the transition portion, the dovetail portion, and platform portion, and the capture pin.

18. The method of claim 16, further comprising:

assembling at least one of braided fibers, wound filaments, fabric, unidirectional tape such that the long axes of the reinforcement material wrap around a radially inner portion of the platform portion to form a capture band;

exposing the at least one of braided fibers, wound filaments, fabric, unidirectional tape to chemical vapor infiltration to rigidize the at least one of braided fibers, wound filaments, fabric, unidirectional tape, and wherein performing slurry infiltration to introduce matrix material precursor into voids between the rigidized reinforcement material in the airfoil portion, the transition portion, the dovetail portion, and the platform portion comprises performing slurry infiltration to introduce matrix material precursor into voids between the rigidized reinforcement material in the airfoil portion, the transition portion, the dovetail portion, and platform portion, and the capture band.

19. The method of claim 16, wherein assembling reinforcement material for the airfoil portion, the transition portion, and the dovetail portion comprises:

forming a bend parallel to the axial plane in at least some substantially radially extending fibers of the plurality of substantially radially extending fibers to define the capture feature.

20. The method of claim 16, wherein assembling reinforcement material for the airfoil portion, the transition portion, and the dovetail portion comprises:

introducing a composite filler between respective substantially radially extending fibers of the plurality of substantially radially extending fibers to define the capture feature.

21. The method of claim 16, wherein the plurality of substantially radially extending fibers comprises a first plurality of substantially radially extending fibers, and wherein assembling reinforcement material for the airfoil portion, the transition portion, and the dovetail portion comprises:

positioning a second plurality of substantially radially extending fibers to extend from adjacent to the first end of the airfoil portion and end adjacent to the capture feature to define the capture feature.

* * * * *